No. 824,541. PATENTED JUNE 26, 1906.
C. HAGER & T. D. FINIZIE.
CAR FENDER.
APPLICATION FILED APR. 10, 1906.
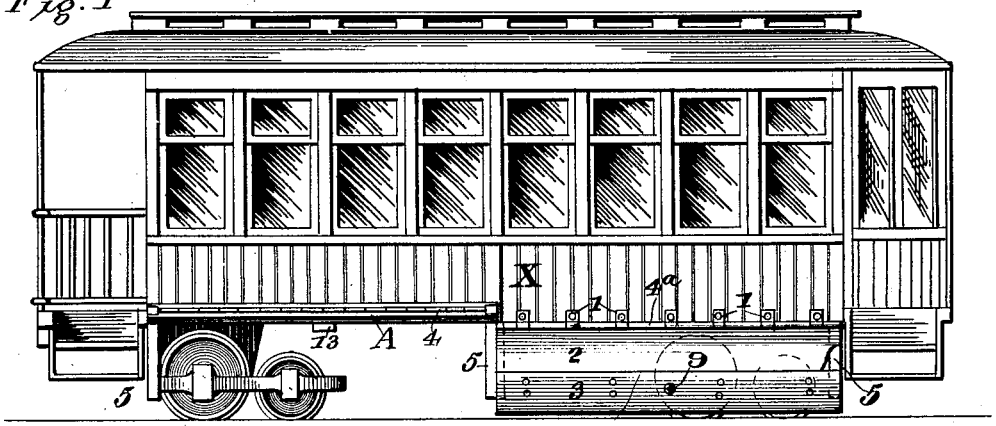
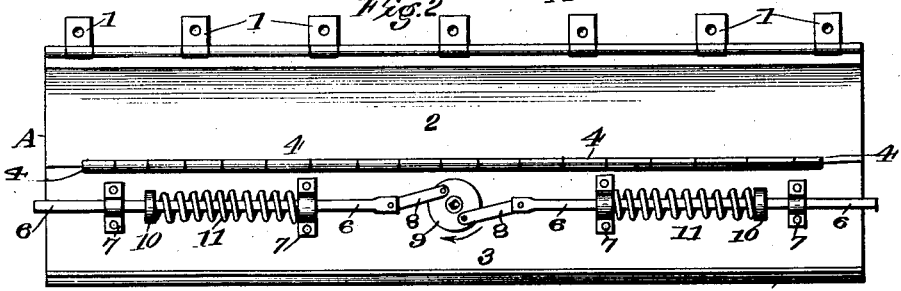
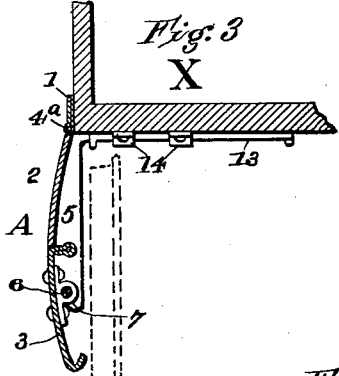
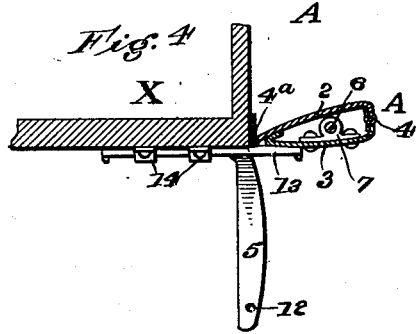
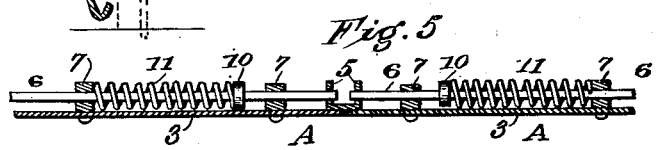
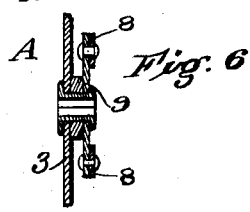
WITNESSES
INVENTORS
CHARLES HAGER
THOMAS D. FINIZIE
BY
ATTORNEYS

UNITED STATES PATENT OFFICE.

CHARLES HAGER AND THOMAS D. FINIZIE, OF NEW YORK, N. Y.

CAR-FENDER.

No. 824,541.          Specification of Letters Patent.          Patented June 26, 1906.

Application filed April 10, 1906. Serial No. 310,927.

*To all whom it may concern:*

Be it known that we, CHARLES HAGER, a citizen of the United States, and THOMAS D. FINIZIE, a subject of the King of Italy, and residents of New York, in the county of New York and State of New York, have invented a new and Improved Car-Fender, of which the following is a specification.

Our invention is an improvement in side fenders for street-railway cars, the same being attached to and pendent from the body of a car and hanging outside of and parallel to the wheels, so as to practically inclose and prevent access to the space between the ends or platforms of the car. The fender is constructed in parts or sections which are arranged in alinement or end to end and supported in pendent normal position by arms or brackets that are rigidly attached to the body of the car, means being provided for locking or securing the fender-sections rigidly to the supports. Each fender-section is hinged to the side or sill of the car and also divided lengthwise, the two parallel portions thus formed being hinged together, so that the fender is adapted to be folded and raised to allow convenient access to the space beneath the car for inspection or repair of the motor or other purpose.

The details of construction, arrangement, and combination of parts are as hereinafter described, reference being had to the accompanying drawings, in which—

Figure 1 is a side view of a street-railway car provided with our improved fender attachment, one section or part thereof being shown pendent or in normal working position and the other folded and raised as required for access to the space beneath the car. Fig. 2 is an enlarged view of the inner side of one of the fender-sections. Fig. 3 is a vertical transverse section of the fender-section in normal position attached to a car-body. Fig. 4 is a similar section, the fender being shown folded and raised as required for access to the space beneath the car. Fig. 5 is a longitudinal section of the lower foldable portion of two alined fender-sections, including an arm or bracket by which they are supported and to which they are locked. Fig. 6 is a section illustrating a portion of the means by which the fender is locked or secured to the arms or brackets pendent from the car-body.

A indicates a fender or a fender-section in the several views. The fender is attached to a car-body X by means of hinges 1, which are suitably bolted or otherwise secured to the lower edges of the body, so as to inclose the space between the platforms of the car. In other words, the fender hangs normally pendent or vertical outside of and parallel to the car-wheels, the lower edge being but one or two inches from the street surface. For the sake of economy of manufacture and convenience in handling two or three fenders or fender-sections A are employed, the same being arranged end to end, as will be understood by reference to Fig. 1. Each fender or fender-section is divided centrally and longitudinally into two parts 2 and 3, which, as indicated in Figs. 3 and 4, have inwardly-projecting flanges 4, that are hinged together, the flanges abutting or being in contact when the fender hangs in normal position. The parts 2 and 3 of the fender are preferably constructed of sheet-steel, and they may be economically struck up by means of dies. They are formed upon the arc of a circle of large radius, so that the fender as a whole is slightly convex, the convex side being outward. In the normal position the fender is supported by means of rigid arms or brackets 5, whose upper ends project inward at a right angle and are bolted to the under side or sill of the car. Two of such arms or brackets 5 are located adjacent to the platforms of the car and a third one at the junction of the alined fender-sections, the same being made of such breadth that the adjacent ends of the sections overlap it, as will be understood by reference to Fig. 1. The outer sides or edges of the arms 5 are formed upon the same radius as the fender, so that when the latter is lowered into working position, as indicated, (see Fig. 3,) the two conform to each other or fit together.

We employ means for locking the fender or securing it rigidly to the pendent arms or brackets 5, and for this purpose we preferably employ devices which are fully illustrated in Figs. 2, 5, and 6. Two rods or extended bolts 6 are arranged in keepers 7 on the inner side of the lower section 3 of the fender, and their inner ends are connected by links 8 with a rotatable hub 9, the latter being journaled in the fender-section 3, as shown in Fig. 6, and provided with central polygonal apertures adapted to receive a key or other device whereby it may be rotated. Each of the slidable bolts or rods 6 is provided with a collar 10, between which and the inner keeper 7 a spiral spring 11 is interposed, the same encircling the bolt or rod. The said springs tend to force the rods 6 outward, as indicated in Fig. 2, so that they may be held engaged with the arms or brackets 5, which are provided with the sockets 12 to receive them. (See Fig. 4.) It will be understood that the springs 11 hold the rods 6 normally projected beyond the edges of the fender-section 3; but upon rotating the hub 9 in the direction of the arrow, Fig. 2, the rods will be retracted against the tension of the springs 11, and thus the fender will be released from engagement with the arms or brackets 5 and may then be folded on the central hinge 4 and turned on the upper hinge 4ª (see Fig. 3) and raised to the horizontal position, as indicated in Fig. 4, in which position it may be temporarily supported by means of bars 13, that slide in keepers 14, attached to the under side of the car-body X. This adaptation of the fender or fender-sections to be folded and raised allows convenient access to the space beneath the car, as may be required for lubrication of the axles or for inspection or repair of the motor or for other purposes incident to practical use of street-cars.

It will be seen that in the pendent position (indicated at the right in Fig. 1 and also in Fig. 3) our improved fender constitutes a practical closure to the entire side space between the platforms of a car, so that danger of accident by a person falling or otherwise passing beneath a car while in motion is completely avoided. The fenders likewise serve as dust-guards to a greater or less extent and constitute a practical ornamental appendage to a car.

What we claim is—

1. A car provided with a side fender which is hinged to the body thereof and hangs normally pendent outside of the wheels, an arm pendent from the car, the fender being in contact therewith, and means for securing the fender to said arm, substantially as described.

2. The combination, with a car having pendent arms or brackets arranged along its sides, of side fenders which are supported in contact with the outer sides of the brackets, and means for securing them detachably to the latter, substantially as described.

3. The combination, with the car-body having pendent rigid arms or brackets arranged along its sides exterior to the wheels, of fenders which are hinged to the body of the car, the same being adapted to be lowered into contact with the brackets, and means for locking them to the brackets, substantially as described.

4. The combination, with the car-body, of fenders which are hinged to the same and hang outside the wheels and are made in two longitudinal parts adapted to fold on each other, and rigid arms or brackets which are pendent from the car and so arranged that the ends of the fenders rest in contact therewith, and devices attached to the lower fender-section or foldable part and adapted to engage the brackets detachably for holding them in the normal position, substantially as described.

5. The combination, with the car-body, of a fender hinged thereto and hanging normally outside of the wheels, rigid arms or brackets attached to and pendent from the car-body, the fenders bearing normally on the same, and means for locking or securing the fender to the brackets, the same consisting of rods which are slidable in keepers attached to the fender, and a rotatable hub which is operatively connected with the inner ends of the rods, and springs for holding the rods normally extended or in locking position, substantially as described.

6. The improved side fender for cars, comprising two longitudinal sections, each formed of sheet metal, and hinged together at their meeting edges, substantially as described.

CHARLES HAGER.
THOMAS D. FINIZIE.

Witnesses:
SOLON C. KEMON,
AMOS W. HART.